United States Patent
Versolato et al.

(10) Patent No.: US 11,378,492 B2
(45) Date of Patent: Jul. 5, 2022

(54) SYSTEM FOR ESTIMATING THE STATE OF WEAR OF A CUTTING TOOL DURING MACHINING

(71) Applicant: Airbus Operations (S.A.S.), Toulouse (FR)

(72) Inventors: Florian Versolato, Toulouse (FR); Emeric Noirot-Nerin, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/164,994

(22) Filed: Feb. 2, 2021

(65) Prior Publication Data

US 2021/0239577 A1 Aug. 5, 2021

(30) Foreign Application Priority Data

Feb. 3, 2020 (FR) ...................................... 2001061

(51) Int. Cl.
*G06F 11/30* (2006.01)
*G01M 99/00* (2011.01)

(52) U.S. Cl.
CPC .................................. *G01M 99/005* (2013.01)

(58) Field of Classification Search
CPC combination set(s) only.
See application file for complete search history.

(56) References Cited

U.S. PATENT DOCUMENTS

| | | | |
|---|---|---|---|
| 5,523,701 A | 6/1996 | Smith et al. | |
| 2003/0045976 A1* | 3/2003 | Bechhoefer | G01M 5/0033 701/30.2 |
| 2018/0150038 A1 | 5/2018 | Lin et al. | |
| 2018/0246494 A1 | 8/2018 | Nakahama | |
| 2019/0033053 A1* | 1/2019 | Eppler | G07C 3/005 |
| 2019/0258222 A1* | 8/2019 | Karandikar | G05B 19/404 |

FOREIGN PATENT DOCUMENTS

| | | |
|---|---|---|
| CN | 106 863 008 A | 6/2017 |
| CN | 107 738 140 A | 2/2018 |
| EP | 1 342 534 A2 | 9/2003 |
| EP | 3 001 265 A1 | 3/2016 |
| JP | S61 252052 A | 11/1986 |
| JP | H06 198547 A | 7/1994 |
| WO | WO 2017/192821 A1 | 11/2017 |

OTHER PUBLICATIONS

French Search Report for Application No. 2001061 dated Sep. 28, 2020.
French Search Report for Application No. 2001062 dated Oct. 8, 2020.

* cited by examiner

*Primary Examiner* — Phuong Huynh
(74) *Attorney, Agent, or Firm* — Jenkins, Wilson, Taylor & Hunt, PA

(57) ABSTRACT

A method and a system for estimating the state of wear of a cutting tool mounted on a machine tool. The system includes an acquisition module configured to acquire, for a determined duration of machining, values of an operating signal specific to the cutting tool mounted on the machine tool, and a microprocessor configured for calculating current values of a set of wear indicators from the values of the operating signal, and determining the state of wear of the cutting tool as a function of the current values of the set of indicators using a predetermined wear model modeling the state of wear of the cutting tool in function of learning values of the set of wear indicators.

12 Claims, 4 Drawing Sheets

SYSTEM FOR ESTIMATING THE STATE OF WEAR OF A CUTTING TOOL DURING MACHINING

CROSS-REFERENCE TO RELATED APPLICATION

This application claims priority to French patent application FR 2001061 filed Feb. 3, 2020, the entire disclosure of which is incorporated by reference herein.

TECHNICAL FIELD

The disclosure herein relates to the field of estimating the state of wear of a cutting tool during machining.

BACKGROUND

Industrially and in particular in the aerospace industry, specialized, numerically controlled machine tools (boring-drilling machines, milling machines) are used which make it possible to machine complex and highly precise shapes, potentially without disassembling the part, according to the numerical definition of this part.

These machine tools are fitted with various cutting tools (drill bits, milling cutters), the state of wear of which has to be monitored in order that the machining is always performed with a high degree of precision and that it meets the tolerance and surface state requirements.

In general, the state of wear of a cutting tool is estimated by direct means by using measurement tools such as, for example, stereoscopic microscopes, profilometers, three-dimensional scanners, lasers, cameras, etc. The measurements taken by this type of tools are precise and repeatable but have the drawback of having to be taken outside of the machining process and therefore necessitate a non-negligible production downtime.

There are indirect measurement means which consist in producing an estimate of a level of wear of a cutting tool according to a count of the machining time on the basis of the predetermined service life of the cutting tool. However, this estimate is imprecise given the fact that the rate of wear is a variable phenomenon that depends on numerous factors. Additionally, the service life defined prior to machining is specified according to a conservative criterion which leads to wastage of cutting tools.

An object of the disclosure herein is therefore to propose an indirect system or method automating the estimation of the state of wear of a cutting tool during machining which exhibits a high degree of precision, thereby avoiding wastage of cutting tools while necessitating no machining downtime.

SUMMARY

The disclosure herein relates to a system for estimating the state of wear of a cutting tool mounted on a machine tool, the system comprising:
an acquisition module configured to acquire, over a determined duration of machining, values of an operating signal specific to the cutting tool mounted on the machine tool, and
a microprocessor configured to:
calculate current values of a set of wear indicators on the basis of the values of the operating signal, and
determine the state of wear of the cutting tool according to the current values of the set of indicators using a predetermined wear model modeling the state of wear of the cutting tool according to the training values for the set of wear indicators.

This system allows precise, rapid, repeatable and real-time estimation of the level of wear of a cutting tool during machining. Thus, this system necessitates no machining downtime and makes it possible to avoid wastage of cutting tools.

Advantageously, in a training phase:
the acquisition module is configured to acquire, over a training machining operation, a set of values of the training operating signal specific to the cutting tool and a set of training wear measurements corresponding to the cutting tool, and
the microprocessor is configured to:
calculate a series of training values for the set of wear indicators on the basis of a first portion of the set of values of the training operating signal,
construct the wear model by applying a regression technique configured to calibrate the series of training values for the set of wear indicators to a first portion of the set of training wear measurements corresponding to the first portion of the set of values of the training operating signal, and
validate the wear model by using a second portion of the set of values of the training operating signal.

Thus, the system makes it possible to construct, in a straightforward and precise manner, a wear model that is able to estimate the level of wear in accordance with the actual wear of the cutting tool.

Advantageously, during the validation of the wear model, the microprocessor is configured to:
use the wear model to estimate test wear values for the cutting tool on the basis of the second portion of the set of values of the training operating signal,
compare the test wear values estimated by the wear model with a second portion of the set of training wear measurements corresponding to the second portion of the set of values of the training operating signal, and
validate the wear model when the difference between the test wear values and the corresponding second portion of the set of training wear measurements does not cross a predetermined threshold.

Thus, the wear model may be validated according to the desired estimation threshold.

Advantageously, the operating signal specific to the cutting tool is a signal that comes from the machine tool during machining, the signal being selected from among the following signals: power, torque, and current intensity.

These signals come from sensors which are already present at the spindle of the machine tool and thus it is not necessary to install new sensors.

As a variant, the operating signal is a vibration signal that comes from the machine tool during machining.

The vibration signal gives a precise indication of the wear of the cutting tool but potentially requires the installation of a vibration sensor at the spindle of the machine tool.

Advantageously, the set of wear indicators comprises:
a first indicator corresponding to the determined duration of machining,
a second indicator corresponding to a standard deviation of the operating signal,
a third indicator corresponding to a kurtosis of the operating signal,
a fourth indicator corresponding to a skewness of the operating signal.

These indicators exhibit an optimal correlation with the level of wear of the cutting tool.

According to one embodiment of the disclosure herein, the system comprises a measurement device used to take the set of training wear measurements for the cutting tool corresponding to the set of values of the training operating signal.

Advantageously, the measurement device is an instrumented tool holder comprising a set of sensors that are configured to measure the wear during machining in the training phase.

According to another embodiment of the disclosure herein, the measurement device is an optical device suitable for measuring the wear of the cutting tool at the end of each machining pass in the training phase.

Advantageously, the microprocessor is configured to access predetermined tuning data comprising cutting condition parameters and an experimental plan defined on the basis of the cutting condition parameters.

Advantageously, the cutting condition parameters comprise depths of pass, widths of pass, feed rates, critical rotational speeds, radii of curvature and cutting plans.

Another subject of the disclosure herein is a machine tool comprising the system for estimating the state of wear of a cutting tool according to any one of the preceding features.

A further subject of the disclosure herein is a method for estimating the state of wear of a cutting tool mounted on a machine tool, the method comprising the following steps:
- acquiring, over a determined duration of machining, values of an operating signal specific to the cutting tool mounted on the machine tool,
- calculating current values of a set of wear indicators on the basis of the values of the operating signal, and
- determining the state of wear of the cutting tool according to the current values of the set of indicators using a predetermined wear model modeling the state of wear of the cutting tool according to training values for the set of wear indicators.

BRIEF DESCRIPTION OF THE DRAWINGS

Other particularities and advantages of the device and of the method according to the disclosure herein will become more clearly apparent from reading the description that is given below, by way of non-limiting indication, with reference to the appended drawings, in which.

DETAILED DESCRIPTION

The principle of the disclosure herein consists in or comprises estimating the state of wear of a cutting tool during machining by interpreting the signals that come from the machine tool.

Figure 1:
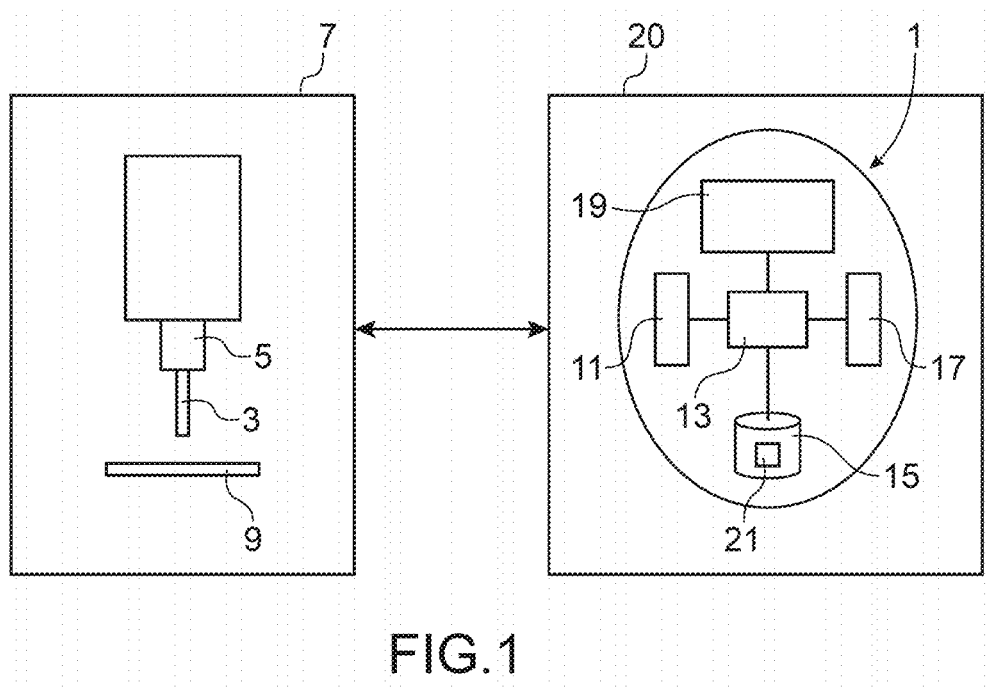
FIG. 1 schematically illustrates a system for estimating the state of wear of a cutting tool, according to one embodiment of the disclosure herein.

FIG. 1 schematically illustrates a system for estimating 1 the state of wear of a cutting tool 3, according to one embodiment of the disclosure herein.

The cutting tool 3 is mounted on a spindle 5 of the numerically controlled machine tool 7 allowing programmed shapes to be machined on a part 9 to be machined. In general, the machine tool 7 is fitted with a magazine in which various cutting (boring-drilling, milling, etc.) tools are located. Thus, the term "cutting too" refers to any type of cutting tool that may be mounted on the machine tool 7.

According to the disclosure herein, the estimation system 1 comprises an acquisition module 11, a microprocessor 13, a storage unit 15, an input interface 17 (a keyboard, for example) and an output interface 19 (a screen, for example). Advantageously, all of these hardware elements of the estimation system 1 are already integrated within a control device 20 for the machine tool 7.

The acquisition module 11 is configured to acquire, at successive times and over a determined duration of machining, values of an operating signal specific to the cutting tool 3 mounted on the machine tool 7.

The operating signal specific to the cutting tool 3 is a signal that comes from the machine tool 7 during the machining operation. Advantageously, this operating signal is a signal which comes from sensors that are already present at the spindle 5 of the machine tool 7. In particular, the operating signal may be a signal of the electrical power of the spindle 5 of the machine tool 7, a torque signal, or a signal of the intensity of electric current flowing in the machine tool. Specifically, the more the cutting tool is worn, the greater the force exerted by the machine tool, thus entailing an increase in the torque, the current draw, power consumption and vibration, etc.

Other types of operating signals that come from the machine tool 7 may be used such as, for example, a vibration signal. In this case, a vibration sensor is installed at the spindle 5 of the machine tool 7 if it is not already equipped with such a sensor.

In addition, the microprocessor 13 is configured to process the values of the operating signal specific to the cutting tool 3 acquired from the machine tool 7. More particularly, the microprocessor 13 is configured to calculate current characteristic values of a set of wear indicators on the basis of the values of the operating signal and then to determine the state of wear of the cutting tool 3 according to these current characteristic values of the set of indicators by using a predetermined wear model 21 stored in the storage unit 15. The wear model 21 is produced beforehand in a training phase for modeling the state of wear of the cutting tool 3 according to training values for the set of wear indicators.

Figure 2:
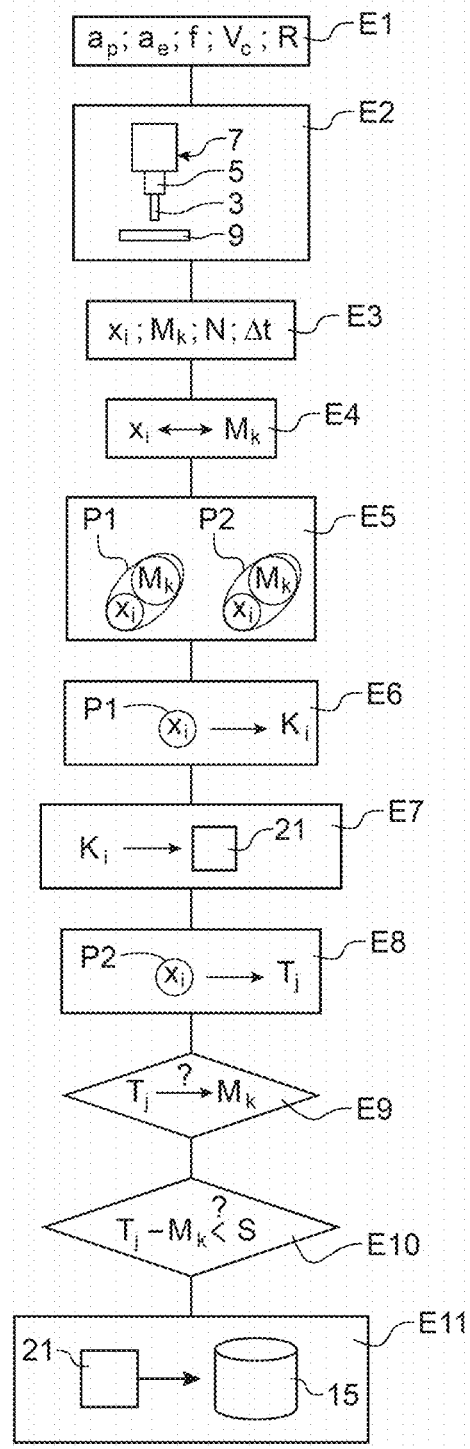
FIG. 2 is a flowchart schematically illustrating the production of the wear model in a training phase, according to one preferred embodiment of the disclosure herein.

FIG. 2 is a flowchart schematically illustrating the production of the wear model in a training phase, according to one embodiment of the disclosure herein.

The flowchart describes the training steps carried out during the machining operations of a cutting tool 3 of interest in order to construct a wear model 21 relating to this tool 3. Of course, a wear model 21 is constructed for each type of cutting tool.

Steps E1 and E2 relate to the preparation of a machining and cutting condition program for the selected cutting tool 3 and the setting up of this tool 3.

Step E1 relates to the tuning of a test program for predetermined data comprising cutting condition parameters for the tool 3 and machining condition parameters for this tool 3. Specifically, from a database relating to the cutting tool 3, the cutting condition parameters for this tool 3 and the machining condition parameters are downloaded. These parameters comprise depths of pass "ap" (i.e. the recess that has to be created in the material of the part 9 by the cutting tool 3); widths of pass "ae" (i.e. the width of the recess); feed rates "f" in mm/min (i.e. the distance traveled by the tool in one minute of removing material); critical rotational speeds "Vc" between the cutting tool 3 and the material; and radii of curvature "R" and cutting plans. In general, for each cutting tool 3 and for each of the cutting condition parameters, an operating interval between a minimum value and a maximum value is defined.

Additionally, an experimental plan is defined on the basis of these cutting condition and machining condition parameters by taking at least the minimum and maximum values of each of these parameters. By defining a set of machining configurations, the experimental plan aims to ensure that the cutting tool 3 is used under its typical conditions, i.e. within a consistent range of values of each of these parameters.

Step E2 relates to choosing and setting up the cutting tool 3 of interest used in the tuning test (i.e. the training phase). Thus, the selected cutting tool 3 is arranged on its tool holder, the tool holder is arranged on the spindle 5 of the machine tool 7 intended for the tuning test and the part 9 to be cut is put in place. Additionally, the previously established tuning program is downloaded. This program will allow the cutting tool 3 to check all of the predefined configurations in the experimental plan.

Step E3 relates to the start of machining (milling, drilling, turning, etc.) and as soon as machining has started, the acquisition of values $x_i$ of the training operating signal that come from the machine tool 7 is launched.

Specifically, the acquisition module 11 is configured to acquire, at predetermined time intervals (for example, at regular intervals of a few minutes), a set of values $x_i$ of the training operating signal specific to the cutting tool 3. By way of example, the operating signal is the power of the spindle 5. Advantageously, the acquisition is carried out according to a sampling N having a frequency higher than or equal to 1 Hz. For example, for a frequency of 100 Hz, 100 values $x_1, x_2, \ldots x_{100}$ of the operating signal are acquired per second. The set of values $x_i$ of the training operating signal is stored in the storage unit 15. The duration $\Delta t$ for which the cutting tool 3 has machined is also stored. This duration is equal to the sum of the predetermined time intervals.

Acquisition of a set of training wear measurements $M_k$ corresponding to the set of values $x_i$ of the training operating signal of the same cutting tool 3 is also carried out.

According to a first embodiment, the estimation system 1 comprises a measurement device (not shown) used to automatically acquire the set of training wear measurements $M_k$ for the cutting tool 3 corresponding to the set of values of the training operating signal. Each wear measurement corresponds, for example, to the average of the maximum values in mm of the wear of the edges or sides of the cutting tool 3.

Advantageously, the measurement device is integrated into the machine tool in the form of an instrumented tool holder comprising a set of sensors that are configured to measure the wear during machining in the training phase. In this case, the acquisition module 11 automatically retrieves the set of training wear measurements $M_k$.

According to a second embodiment, the measurement device is a device which is not integrated into the machine tool 7 and may be an optical tool such as a stereoscopic microscope or camera, or a measurement tool such as a profilometer, three-dimensional scanner, etc. This measurement device is used to directly measure the wear of the cutting tool 3 at the end of each machining pass of the experimental plan defined for training.

In steps E4-E7, the microprocessor 13 is configured to construct the wear model 21.

More particularly, in step E4, the microprocessor 13 is configured to clean up the data by deleting, for example, inconsistent data. Additionally, the microprocessor 13 is configured to contextualize the set of training wear measurements $M_k$ with the set of values $x_i$ of the training operating signal that comes from the machine tool 7.

In step E5, the microprocessor 13 is configured to subdivide the set of values $x_i$ of the training operating signal and the corresponding set of training wear measurements $M_k$ into first P1 and second P2 portions. The first portion P1 (for example about 70%) is used to calibrate the wear model 21 while the second portion P2 (the remaining 30%, for example) is used to test the model 21.

In step E6, the microprocessor 13 uses the first portion P1 of the set of values $x_i$ of the training operating signal to calculate a series of training values relating to the set of wear indicators. This set of wear indicators comprises a first indicator $K_1$ corresponding to the determined duration of machining, a second indicator $K_2$ corresponding to a standard deviation of the operating signal, a third indicator $K_3$ corresponding to a kurtosis of the operating signal, and a fourth indicator $K_4$ corresponding to a skewness of the operating signal. These indicators aim to transform the values of the operating signal over a predetermined time interval into a single value representative of the operating signal over this interval. The predetermined time interval may be a few minutes, for example five minutes.

The first indicator $K_1$ is simply the duration $\Delta t$ of machining stored during the acquisition, in step E3, of the set of values $x_i$ of the training operating signal. Thus, this first indicator $K_1$ indicates the total time that the cutting tool 3 has spent in the material:

$$K_1 = \Delta t \tag{1}$$

The second indicator $K_2$ corresponding to the standard deviation $\sigma$ of the operating signal is defined according to the values $x_i$ of the operating signal, the sampling N which represents the number of acquisitions per second and the average $\bar{x}$ of these N values $x_i$. The second indicator $K_2$ (i.e. the standard deviation $\sigma$) is thus defined as follows:

$$K_2 = \sigma = \sqrt{\frac{1}{N} \sum_{i=1}^{N} (x_i - \bar{x})^2} \tag{2}$$

The third indicator $K_3$ is a kurtosis K of the operating signal defined according to the standard deviation $\sigma$ (i.e. the second indicator $K_2$) in addition to the values $x_i$ of the operating signal, the sampling N and the average $\bar{x}$. The third indicator $K_3$ (i.e. the kurtosis K) is thus defined as follows:

$$K_3 = K = \frac{1}{N} \sum_{i=1}^{N} \frac{(x_i - \bar{x})^4}{\sigma^4} \tag{3}$$

The fourth indicator $K_4$ is a skewness Sk of the operating signal defined according to the same variables as the third indicator $K_3$ as follows:

$$K_4 = Sk = \frac{1}{N} \sum_{i=1}^{N} \frac{(x_i - \bar{x})^3}{\sigma^3} \tag{4}$$

In step E7, the microprocessor 13 is configured to construct the wear model 21 by applying, for example, a regression technique to the set of indicators $K_1$-$K_4$. Specifically, the regression technique is used to calibrate the series of training values for the set of wear indicators $K_1$-$K_4$ on the first portion P1 of the set of training wear measurements $M_k$ corresponding to the first portion P1 of the set of values $x_i$ of the training operating signal.

Various regression algorithms may be used such as, for example, linear regressions using penalties such as ridge or lasso or regressions based on decision trees such as XGBoost, etc. It is possible to use standard rules and/or hyperparameter optimization methods known to those skilled in the art to calibrate the regression algorithms.

By way of non-limiting example, the wear may be expressed as a superposition of various indicators $K_i$ assigned weighting coefficients $\alpha_i$ generated by the regression algorithm. Thus, the estimated wear may be expressed as follows:

$$U = \Sigma_{i=1}^{4} K_i \alpha_i \quad (5)$$

It should be noted that the estimate given by formula (5) above is just an example specific to some types of regression algorithms.

Additionally, in order to optimize the regression algorithm with the desired degree of precision, it is possible to adjust (in a manner known to those skilled in the art) the hyperparameters specific to the algorithm. For example, each weighting coefficient $\alpha_1$ associated with each indicator $K_i$ of formula (5) is generated by hyperparameters.

Figure 3A:
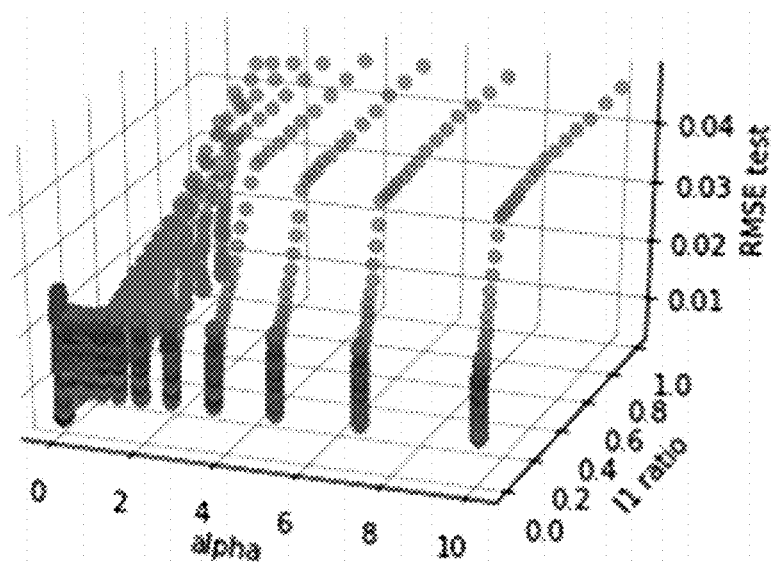
FIGS. 3A and 3B are graphs illustrating regression algorithm optimization techniques, according to one embodiment of the disclosure herein.
Figure 3B:
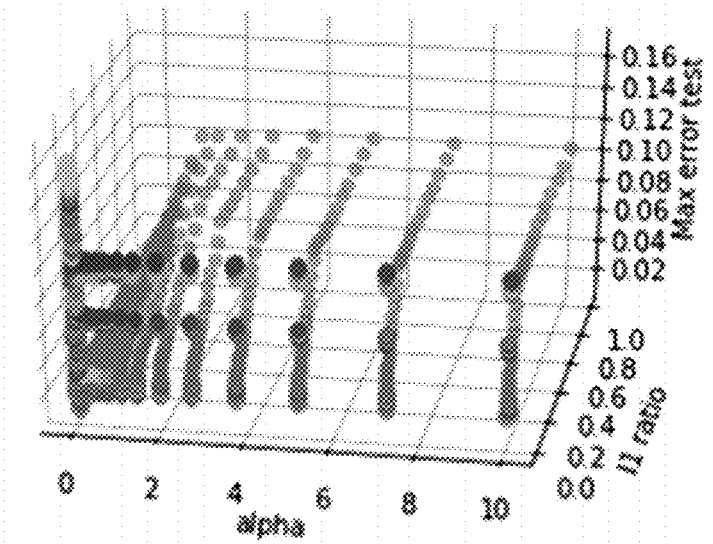

Specifically, FIGS. 3A and 3B are graphs illustrating regression algorithm optimization techniques. More particularly, FIG. 3A illustrates the variations in a maximum error "Max error" according to the values of the hyperparameters "alpha" and "L1 ratio" of the regression algorithm. FIG. 3B illustrates the variations in an average prediction error "RMSE" according to the values of the hyperparameters "alpha" and "L1 ratio" of the regression algorithm.

The maximum error "Max error" and the average error "RMSE" are used as performance metrics, the aim being to make these metrics tend toward zero in order to obtain the best possible precision. In other words, the pair (alpha, L1 ratio) is sought which minimizes these errors "Max error" and "RMSE" for each point (i.e. for each indicator $K_i$).

In steps E8-E10, the microprocessor 13 is configured to validate the wear model 21 by a validation test by using a second portion of the set of training operating signals.

More particularly, in step E8, the microprocessor is configured to test the wear model 21 constructed previously by using the second portion P2 of the set of values $x_i$ of the training operating signal in order to estimate test wear values $T_j$ for the cutting tool 3.

In step E9, the microprocessor 13 is configured to compare the test wear values $T_j$ estimated by the wear model 21 with the second portion P2 of the set of actual training wear measurements $M_k$ corresponding to the second portion P2 of the set of values $x_i$ of the training operating signal.

Figure 4:
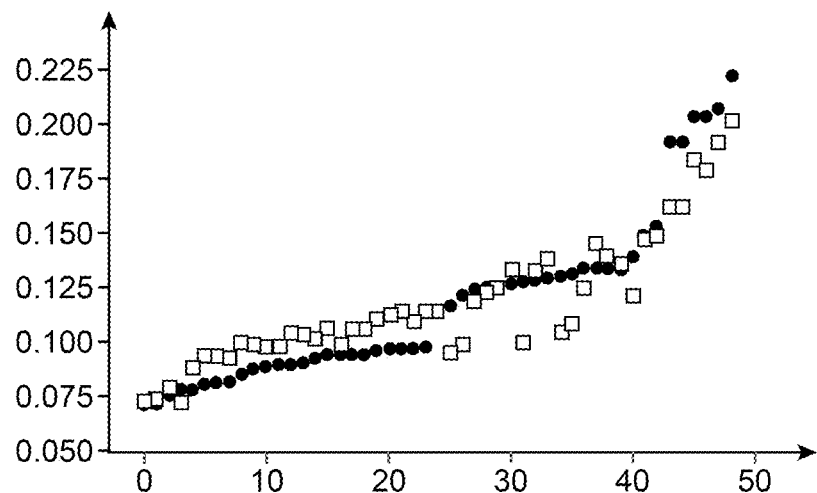
FIG. 4 is a graph illustrating the comparison between estimated wear values and actual wear measurements, according to one embodiment of the disclosure herein.

By way of example, FIG. 4 is a graph illustrating the comparison between the estimated wear values $T_j$ and the actual wear measurements $M_k$.

According to this example, the estimated wear values $T_j$ are evaluated by a wear model 21 constructed by using a linear regression algorithm. This graph has the wear in mm on the ordinate and the machining number on the abscissa. The dots represent actual wear measurements $M_k$ while the squares represent the wear values $T_j$ estimated by the wear model 21. This graph shows quite a good correlation between the actual values and the estimated values.

In step E10, the microprocessor 13 is configured to validate the wear model 21 when the difference between the test wear values $T_j$ and the corresponding second portion P2 of the set of actual training wear measurements $M_k$ does not cross a predetermined threshold S. The threshold S may be determined according to the precision desired for the wear estimate and the type of operation. In general, an error in the estimate of about 10% is considered to be acceptable.

In step E11, the wear model 21 is stored in the storage unit 15 and may then be used as a wear model 21 to estimate, in real time and automatically, the wear of a cutting tool 3 in a machining operation. It should be noted that a wear model 21 is stored in the storage unit 15 for each type of cutting tool.

Figure 5:
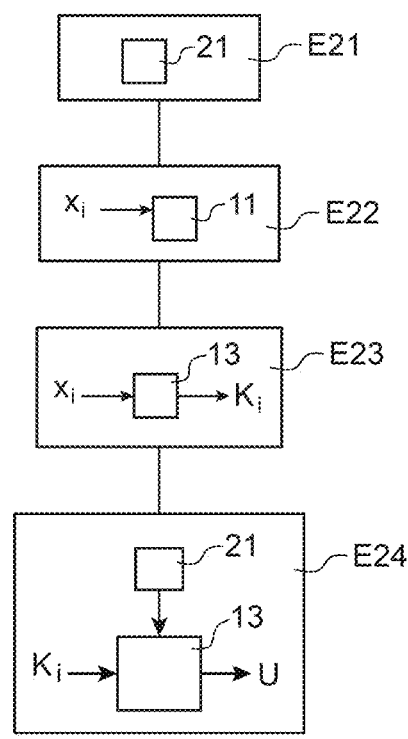
FIG. 5 is a flowchart schematically illustrating a method for estimating the state of wear of a cutting tool, according to one preferred embodiment of the disclosure herein.

FIG. 5 is a flowchart schematically illustrating a method for estimating the state of wear of a cutting tool, according to one preferred embodiment of the disclosure herein.

In step E21, the wear model 21 developed for the type of cutting tool 3 of interest, which is mounted on the spindle 5 of the machine tool 7, is downloaded.

In step E22, as soon as machining has started, the acquisition module 11 is configured to regularly acquire, at successive times and over a determined duration of machining, the values $x_i$ of the operating signal (for example, the power of the spindle) specific to the cutting tool 3 of interest.

In step E23, the microprocessor 13 is configured to calculate the current characteristic values of the set of indicators $K_1$-$K_4$, defined by formulas (1)-(4), on the basis of the values $x_i$ of the wear operating signal.

In step E24, the microprocessor 13 is configured to use the wear model 21 downloaded in step E21 to determine the state of wear U of the cutting tool 3 according to the current characteristic values of the set of indicators $K_1$-$K_4$. The result U of the estimation may be displayed on the output interface 19 (for example, the screen of the machine tool). The regularity of the estimation of the state of wear may be predefined according to the type of machining. For example, the microprocessor 13 may be configured to calculate ten estimates for each milling sequence.

Thus, the estimation system and method according to the disclosure herein make it possible to indirectly measure the level of wear of a cutting tool of interest during machining and make it possible to warn in real time of premature wear. The disclosure herein also makes it possible to optimally manage the service life of the cutting tool. Additionally, the estimation system consumes very little computing power and requires very little additional hardware, facilitating its integration into all sorts of industrially used machine tools.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for estimating a state of wear of a cutting tool mounted on a machine tool, the system comprising:
    an acquisition module configured to acquire, over a determined duration of machining, values of an operating signal specific to the cutting tool mounted on the machine tool; and
    a microprocessor configured to:
        calculate current values of a set of wear indicators on a basis of the values of the operating signal; and
        determine the state of wear of the cutting tool according to the current values of the set of wear indicators using a predetermined wear model modeling the state of wear of the cutting tool according to training values for the set of wear indicators;
    wherein the acquisition module is configured to acquire, over a training machining operation, a set of values of the training operating signal specific to the cutting tool and a set of training wear measurements corresponding to the cutting tool; and
    wherein the microprocessor is configured to:
        calculate a series of training values for the set of wear indicators on a basis of a first portion of the set of values of the training operating signal;
        construct the wear model by applying a regression technique configured to calibrate the series of training values for the set of wear indicators to a first portion of the set of training wear measurements corresponding to the first portion of the set of values of the training operating signal; and
        validate the wear model by using a second portion of the set of values of the training operating signal.

2. The system of claim 1, wherein, during the validation of the wear model, the microprocessor is configured to:
    use the wear model to estimate test wear values for the cutting tool on a basis of the second portion of the set of values of the training operating signal;
    compare the test wear values estimated by the wear model with a second portion of the set of training wear measurements corresponding to the second portion of the set of values of the training operating signal; and
    validate the wear model when a difference between the test wear values and the corresponding second portion of the set of training wear measurements does not cross a predetermined threshold.

3. The system of claim 1, wherein the operating signal specific to the cutting tool is a signal that comes from the machine tool during machining, the signal being selected from the group consisting of the following signals: power, torque, and current intensity.

4. The system of claim 1, wherein the operating signal is a vibration signal that comes from the machine tool during machining.

5. The system of claim 1, wherein the set of wear indicators comprises:
    a first indicator corresponding to a determined duration of machining;
    a second indicator corresponding to a standard deviation of the operating signal;
    a third indicator corresponding to a kurtosis of the operating signal; and
    a fourth indicator corresponding to a skewness of the operating signal.

6. The system of claim 1, comprising a measurement device used to take the set of training wear measurements for the cutting tool corresponding to the set of values of the training operating signal.

7. The system of claim 6, wherein the measurement device is an instrumented tool holder comprising a set of sensors configured to measure wear during machining in the training phase.

8. The system of claim 6, wherein the measurement device is an optical device for measuring wear of the cutting tool at an end of each machining pass in the training phase.

9. The system of claim 1, wherein the microprocessor is configured to access predetermined tuning data comprising cutting condition parameters and an experimental plan defined on a basis of the cutting condition parameters.

10. The system of claim 9, wherein the cutting condition parameters comprise depths of pass, widths of pass, feed rates, critical rotational speeds, radii of curvature and cutting plans.

11. A machine tool comprising the system for estimating the state of wear of a cutting tool of claim 1.

12. A method for estimating state of wear of a cutting tool mounted on a machine tool, the method comprising:
    acquiring, over a determined duration of machining, values of an operating signal specific to the cutting tool mounted on the machine tool;
    calculating current values of a set of wear indicators on a basis of the values of the operating signal; and
    determining the state of wear of the cutting tool according to current values of the set of indicators using a predetermined wear model modeling the state of wear of the cutting tool according to training values for the set of wear indicators; and
    over a training machining operation, the method comprising:
    acquiring a set of values of the training operating signal specific to the cutting tool and a set of training wear measurements corresponding to the cutting tool, and
    calculating a series of training values for the set of wear indicators on a basis of a first portion of the set of values of the training operating signal;
    constructing the wear model by applying a regression technique configured to calibrate the series of training values for the set of wear indicators to a first portion of the set of training wear measurements corresponding to the first portion of the set of values of the training operating signal; and
    validating the wear model by using a second portion of the set of values of the training operating signal.

* * * * *